J. V. ROBINSON.
AUTOMATIC TRAIN PIPE CONNECTOR.
APPLICATION FILED JAN. 27, 1914. RENEWED MAR. 10, 1917.

1,245,787.

Patented Nov. 6, 1917.
4 SHEETS—SHEET 1.

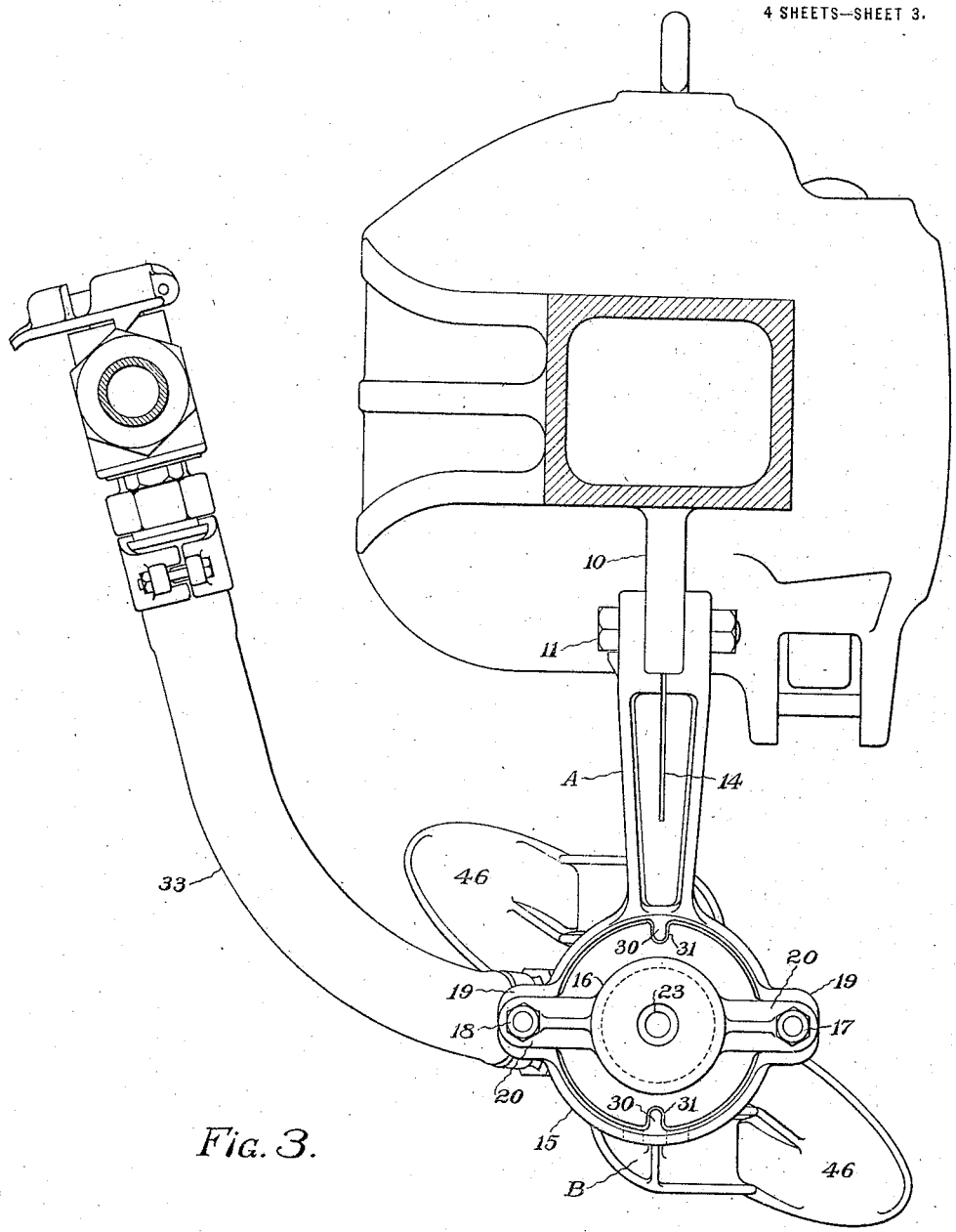

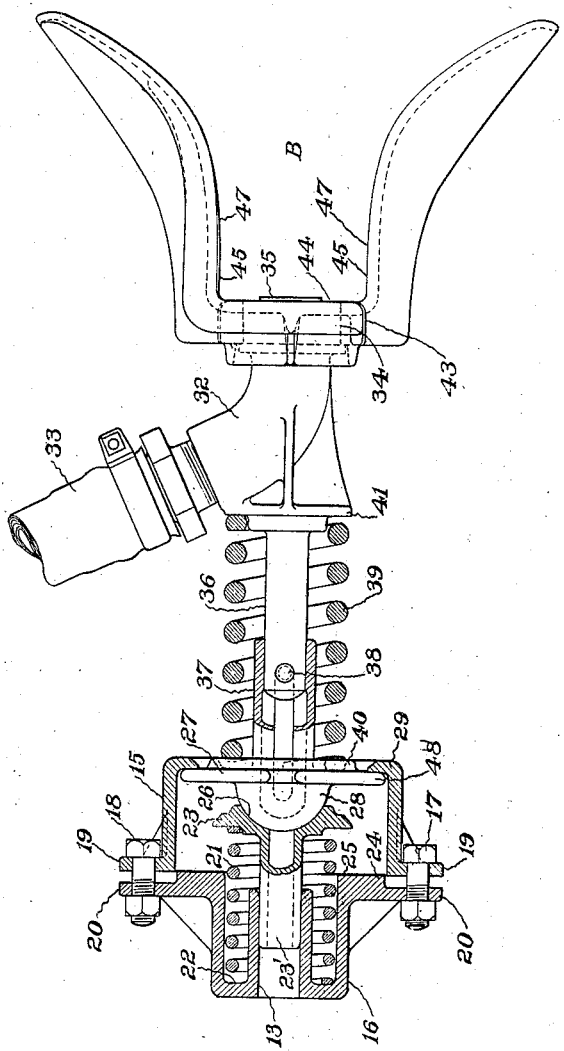

UNITED STATES PATENT OFFICE.

JOSEPH V. ROBINSON, OF BRANFORD, CONNECTICUT.

AUTOMATIC TRAIN-PIPE CONNECTOR.

1,245,787.  Specification of Letters Patent.  Patented Nov. 6, 1917.

Application filed January 27, 1914, Serial No. 814,759. Renewed March 10, 1917. Serial No. 154,006.

*To all whom it may concern:*

Be it known that I, JOSEPH V. ROBINSON, a citizen of the United States, and resident of Branford, county of New Haven, State of Conn., have invented certain new and useful Improvements in Automatic Train-Pipe Connectors, of which the following is a specification.

My invention relates to automatic train pipe connectors for railway cars and has among its objects to provide an improved support for automatic connectors which will support coupled connector heads, with the minimum resistance to lateral movement thereof and the maximum resistance to longitudinal movement, thereby insuring a better connection between the faces of coupled connector heads in rounding curves, etc., with reduced strains to all the parts.

With these objects in view, this invention consists in certain novel features of construction and in certain parts, improvements and combinations, as will be hereinafter fully described, pointed out in the appended claims and illustrated in the accompanying drawings, in which:

Fig. 3 is a rear view of my invention, and

Fig. 4 is a horizontal sectional view of Fig. 1.

Figure 1:
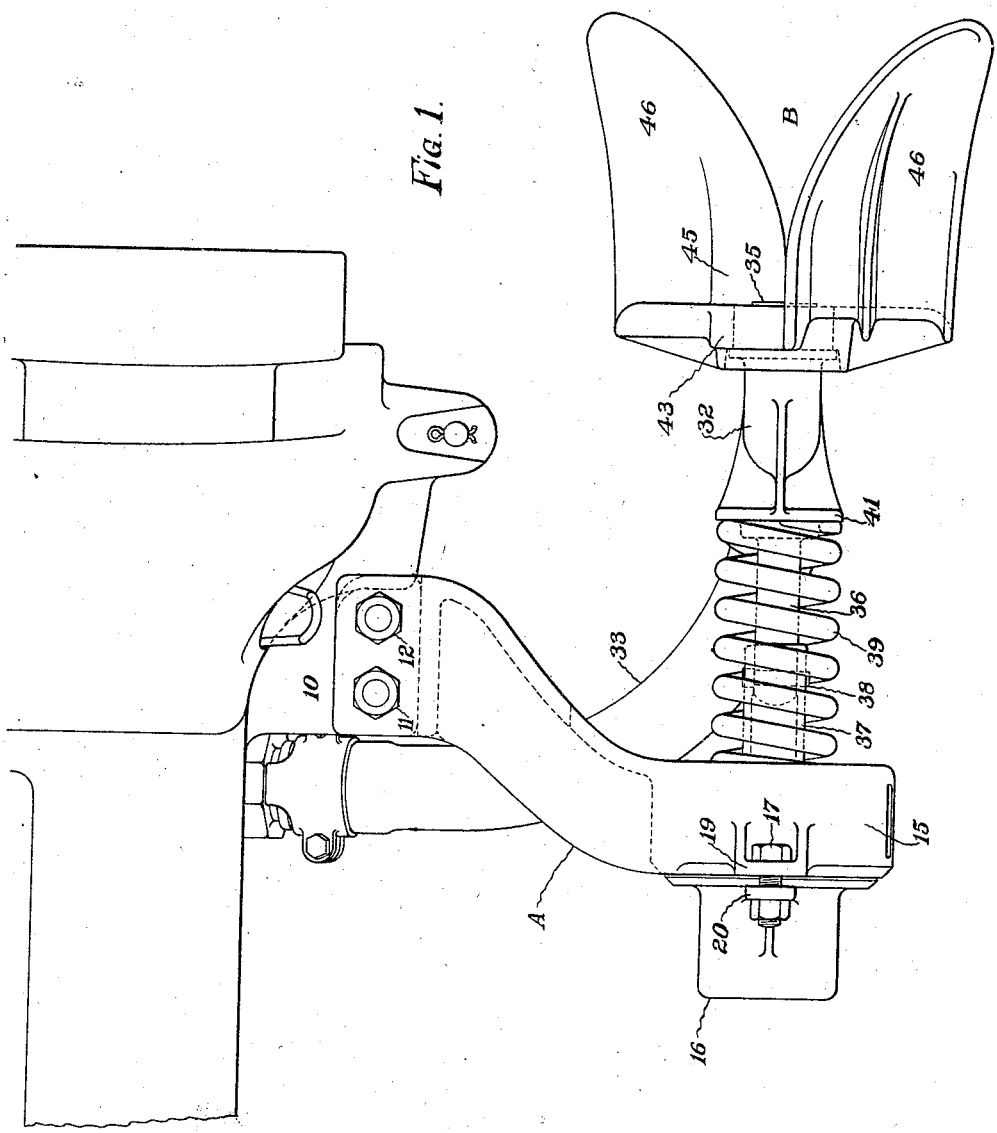
Figure 1 is a side elevation of my improved connector.
Figure 2:
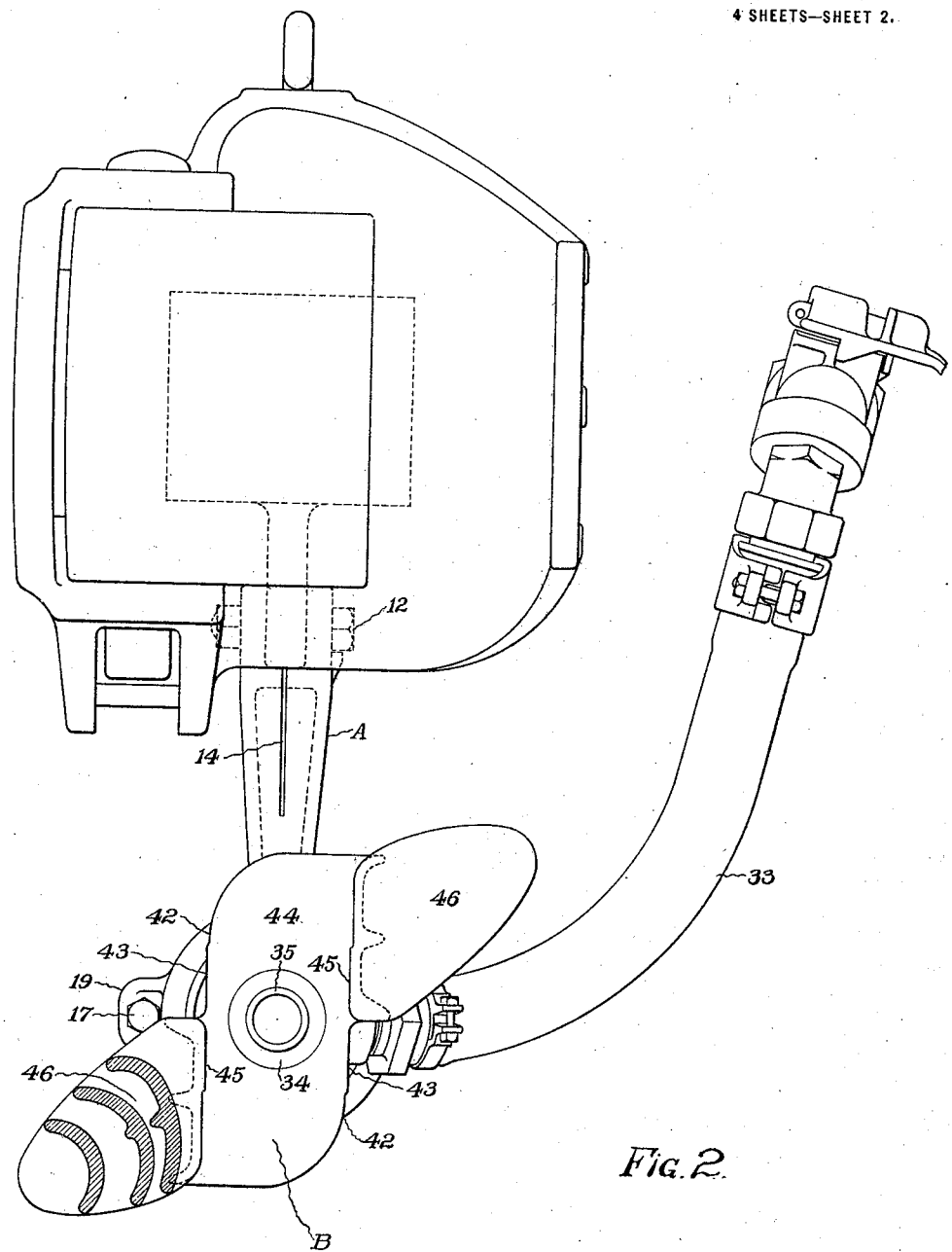
Fig. 2 is a front face view thereof.

Referring to the drawings: The connector comprises a base A secured to a lug 10 of the car by bolts 11 and 12, the arm of the base being split, as shown at 14, to insure proper fit upon the lug 10. At its lower extremity the base is provided with a hollow body 15 to which an abutment 16 is connected in any suitable manner, as by bolts 17 and 18, which bolts lie in perforated ears 19 and 20 of the abutment and body respectively.

A resilient support preferably a spring 21, is seated on the bottom 22 of the abutment and extends into the body 15. The spring carries at its forward end a disk 23 adapted to seat upon the face 24 of the abutment at 25 when the connector is coupled up in service. The disk is provided with a partly spherical socket 26 in which a plate 27 having a partly spherical convex rear face 28 is mounted for pivotal or oscillatory movement. Said plate also operates within the body 15 and is held at the limit of its forward movement therein, against the flange 29 of the body by the supporting spring 21. The plate is held against rotation about its longitudinal axis by the coöperating ribs and notches 30 and 31 of the body and plate 15 and 27 respectively.

A curved fluid conduit 32 is provided to which the hose 33 of the car equipped with the automatic connector is suitably secured, the conduit having at one end an enlarged portion 34 which extends through a perforation in the connector or coupling head B and upon which such head is mounted. Said enlarged portion 34 of the conduit carries a gasket 35 of any desired construction and material, preferably rubber.

A stem 36 connected with the conduit 32, extends into a hollow neck or projection 37 of the plate 27 and has lineal movement therein to a limited extent, a pin 38 being the means of limiting such movement of the stem, and the means also of preventing undue rotary and lineal movement of the head B relative to the plate 27. A main or buffer spring 39, for extending the head forwardly of the base A and placing it under pressure, is interposed between the conduit 32 and the plate 27. The spring surrounds the stem 36 and the neck or projection 37 with one end resting in an annular seat 40 of the plate 27, and the other end bearing against a shoulder 41 of the conduit 32.

These several parts of my invention are assembled by passing the plate 27 into the hollow body 15 of the base A from the rear, then placing the buffer spring 39 in position between the plate 27 and the fitting 32, upon which fitting the connector head B has previously been mounted. After this, the stem 36 and the neck 37 are connected by a pin 38. The disk 23 is next positioned on the plate and the supporting spring 21 inserted. The abutment 16 is then adjusted on the bolts 17 and 18 until the spring 21 exerts the desired pressure against the plate 27 which completes assembly. Such pressure of the spring 21 must, of course, be sufficient to hold the plate 27 firmly against the flange 29 of the base A and maintain the connector head B in correct position for coupling. Undue lateral deflection of said spring 21 when the plate 27 is tilted as the connector couples on curves, etc., is prevented by providing the disk 23 with a shank 23′ adapted to fit snugly within the portion 13 of the abutment and support the spring against such deflection.

To insure proper register of the gaskets 35 of mating connectors in coupling on curves, etc., I provide a connector head B of rectangular outline. And upon the sides 42 of the head B I provide portions 43 which extend rearwardly from the coupling face 44 of the head and substantially at a right angle thereto, to constitute coöperating portions for mating with the bearing surfaces 45 of the prongs 46 in coupling, whereby mating connector heads are firmly held against relative angular movement. These portions 43 are approximately of the same dimensions as the bearing surfaces 45 and lie entirely in the vertical plane.

The guiding prongs 46 serve to aline the heads under conditions of disalinement and they extend forwardly and outwardly of the head and are provided with the said bearing surfaces 45. These surfaces project in front of the connector head B and at a right angle to the face thereof to approximately the point 47 of the prongs and cover only a part of the face of the prongs, and like the portions 43 lie entirely in the vertical plane; their purpose being to constitute sockets in which the sides 43 of the heads seat in coupling, effectively preventing relative rocking of coupled heads.

When two connectors constructed as above described are brought together in the act of coupling, the connector heads B are guided into alinement by the guiding prongs 46, and are then pressed rearwardly. As the supporting spring 21 is considerably weaker than the main or buffer spring 39, it compresses first until the disk 23 seats upon the abutment 16 at 25. Further rearward movement of the heads will compress the buffer spring 39 and effect a tight rigid joint between the faces of the mating connectors. In coupling on curves, etc., the lateral movement required to adjust the heads to such position rocks the plate 27 about its edge 48, the spring 21 yielding to permit of such movement and operating to return the plate, and of course the coupling head B, to normal position after such movement.

While I have shown a particular type of coupling head B, it is of course to be understood that any other satisfactory form of connector head may be used with my improved support.

Having thus described my said invention, what I claim as new and desire to secure by United States Letters Patent is:

1. In an automatic train pipe connector, the combination of a base having an opening in its face, a coupling head, a plate at the rear of said opening and connected with said coupling head, and a pivotal seat for said plate also at the rear of said opening, said seat being adapted to shift longitudinally of the base with the plate as the connector couples up in service.

2. In an automatic train pipe connector, the combination of a coupling head, a base having a hollow body, a plate, a partly spherical seat shiftable in said body on which seat said plate is adapted to oscillate, a coupling head connected with the plate, and means acting against said plate for extending said head and placing it under pressure.

3. In an automatic train pipe connector, the combination of a base having an opening in its face, a coupling head adapted to move longitudinally of the car in coupling, a plate connected with said head, and a pivotal seat for said plate adapted to shift longitudinally of the base during initial longitudinal movement of said head and to become stationary relative to said base during final longitudinal movement of the head.

4. In an automatic train pipe connector, the combination of a base having an opening in its face, a coupling head, a plate at the rear of said opening and connected with said head, an abutment secured to said base, and a seat for said plate in which the plate is adapted to oscillate, said seat being shiftable longitudinally of said base and adapted to seat upon said abutment when the connector couples up in service.

5. In an automatic train pipe connector, the combination of a base having an opening in its face, a coupling head, a plate at the rear of said opening and connected with said head, a supporting spring behind said plate, and a pivotal seat between said spring and plate in which the plate is adapted to oscillate as the connector couples up in service.

6. In an automatic train pipe connector, the combination of a base having an opening in its face, a seat for a spring at the rear of said opening and connected with said base, a spring mounted on said seat, a disk carried by the forward end of said spring, a plate pivotally mounted on said disk and projected by said spring, and a coupling head carried in front of the plate for lineal and oscillatory movement therewith.

7. In an automatic train pipe connector, the combination of a base having an opening in its face, a seat at the rear of said opening and connected with said base, a spring in said seat, a disk having a partly spherical concave socket in its face carried by the forward end of the spring, a plate having a partly spherical convex rear face mounted in said socket, said plate being projected by said spring, and a coupling head carried in front of said plate for lineal and oscillatory movement therewith.

8. In an automatic train pipe connector, the combination of a coupling head, a base having a hollow body, a spring in said body, a seat for the spring secured at the rear of the body, a second seat for the spring movably mounted at the forward part of the body, and having a partly spherical seat, a plate movably mounted on said spherical seat and connected with said coupling head, and means for adjusting said first mentioned seat to vary the pressure of said spring against said plate.

9. In an automatic train pipe connector, the combination of a hollow base, a coupling head, a plate mounted in said base for oscillatory movement, said plate being connected with said coupling head, a spring at the rear of the plate for resisting lineal and oscillatory movement of the latter, and means for preventing undue lateral deflection of said spring during such oscillatory movement of said plate.

10. In an automatic train pipe connector, the combination of a base having a hollow body, a plate having lineal and oscillatory movement in said body, a coupling head connected with said plate and being movable lineally relative thereto, and a spring interposed between said plate and coupling head for extending the latter and resisting lineal movement thereof.

11. In an automatic train pipe connector, the combination of a base having a hollow body, a flange at the forward end of said body, a plate within the body, a supporting spring tending normally to hold said plate against said flange, a projection carried by said plate, a coupling head having a stem connected with said projection, the stem being adapted to move lineally relative to the projection and laterally therewith, and a spring interposed between said plate and said coupling head.

12. In an automatic train pipe connector, the combination of a coupling head, a base having an opening in its face, a plate engaging said base at the rear of said face and connected with said coupling head, an abutment at the rear of said base, a spring for supporting said head seated upon said abutment about the forward end of which spring the plate is adapted to oscillate, a stem extending from said head and movably connected with said plate, and a spring interposed between the head and the plate and surrounding said stem for extending said head forwardly of said base and for placing the head under pressure in coupling.

In testimony whereof, I have hereunto set my hand in the presence of two witnesses.

JOSEPH V. ROBINSON.

In the presence of—
S. L. TILLER,
M. C. SHERIDAN.